Sept. 25, 1962
E. O. ENGELS
3,055,318
DOUGH SHEETING APPARATUS
Filed May 2, 1960
3 Sheets-Sheet 1
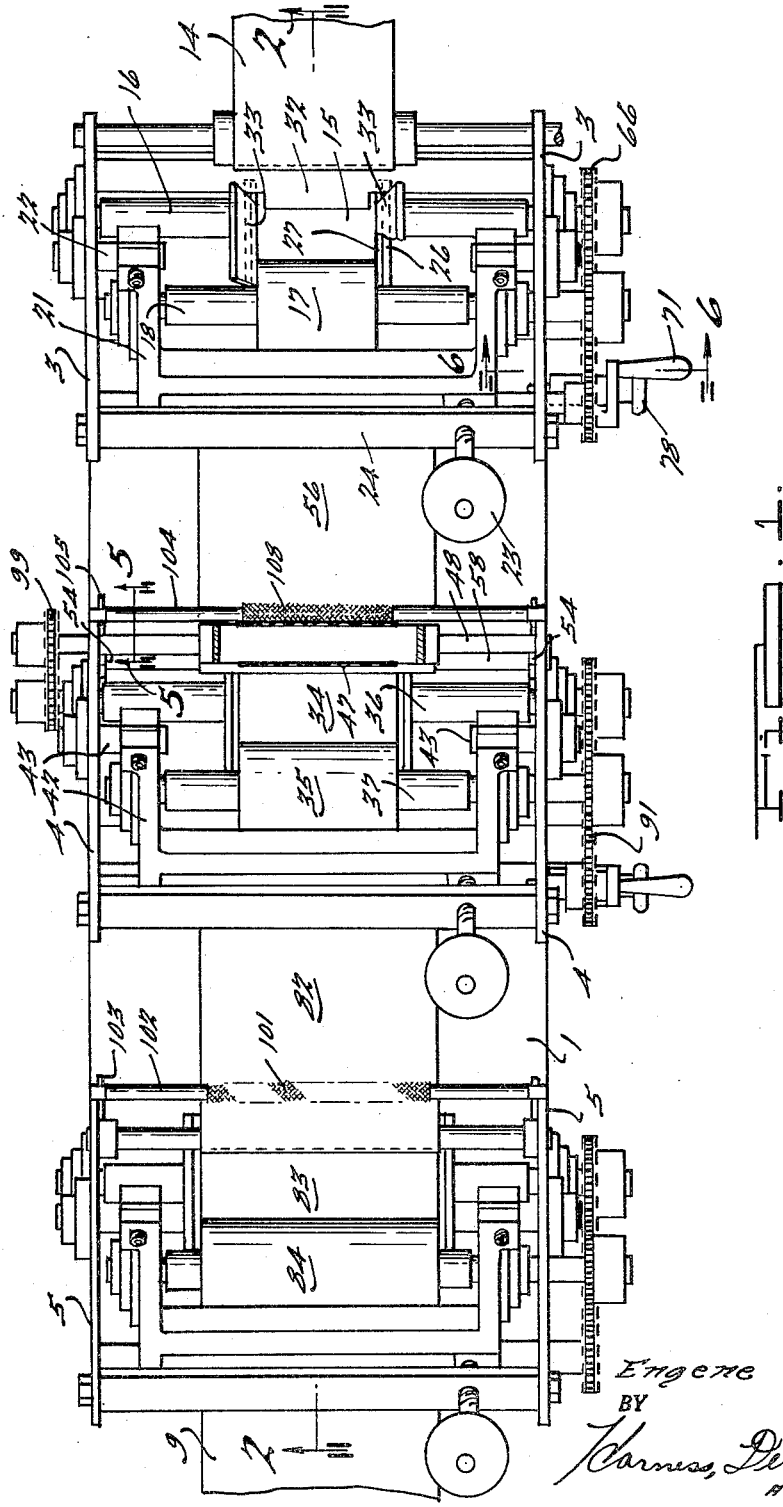
INVENTOR.
Eugene O. Engels
BY
Harness, Dickey & Pierce.
ATTORNEYS.

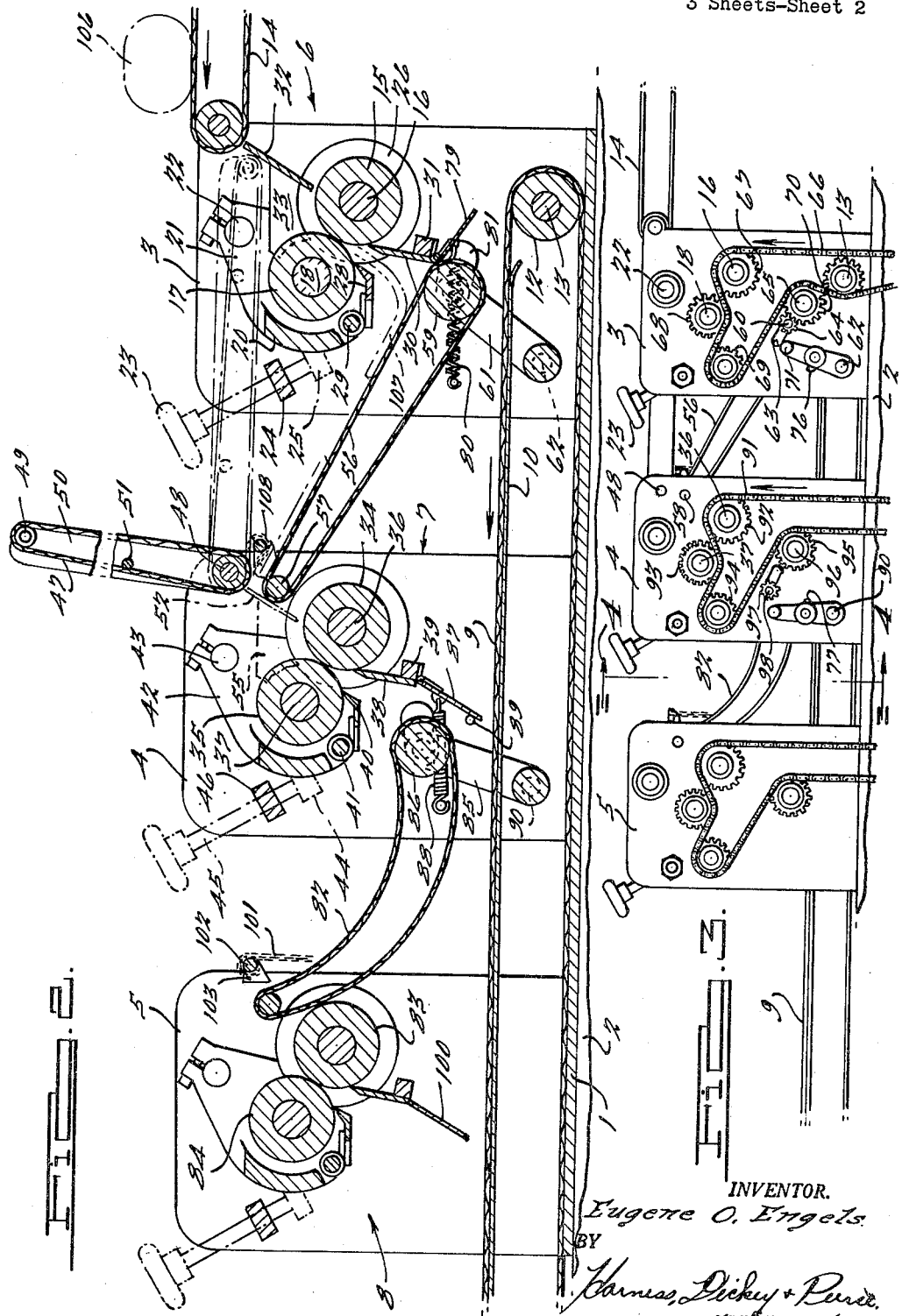

Sept. 25, 1962  E. O. ENGELS  3,055,318
DOUGH SHEETING APPARATUS
Filed May 2, 1960  3 Sheets-Sheet 3
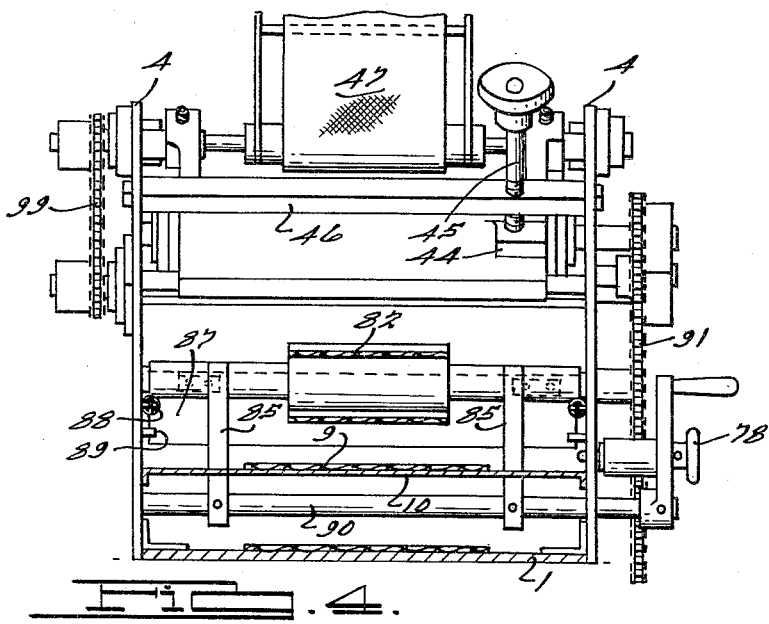
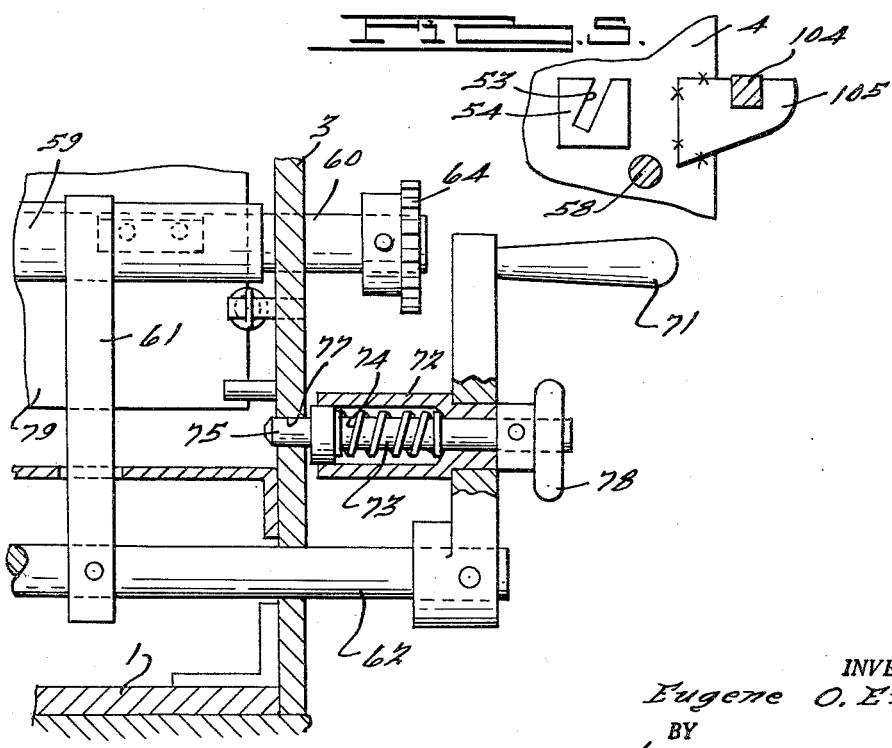
INVENTOR.
Eugene O. Engels
BY
Hauness, Dickey + Pierce
ATTORNEYS United States Patent Office 3,055,318
Patented Sept. 25, 1962

3,055,318
DOUGH SHEETING APPARATUS
Eugene O. Engels, 423 Brockway Place, Saginaw, Mich.
Filed May 2, 1960, Ser. No. 26,115
10 Claims. (Cl. 107—12)

The present invention resides in an improved dough sheeting apparatus for use in highly mechanized bread making plants and which is characterized by the facility with which it may be adjusted to achieve optimum results on different sizes and types of dough pieces.

As is well known, bread dough at the stage of fermentation and proofing at which it is molded into the final "loaf" shape and placed in the bread pans has unique physical properties and characteristics which govern and limit its mechanical treatment. During fermentation some of the gas bubbles or cells that are formed tend to become of excessive size and therefore the dough must be repeatedly worked to press out the surplus gas from the large cells. Thereafter, fermentation is permitted to form new small cells. This operation may be repeated several times to ensure obtaining the ideal loaf in which the gas cells are uniformly small and uniformly distributed. However, the dough is a delicate material which can be ruptured by mechanical treatment unless carefully controlled and sufficiently gentle in character.

To effect the above mentioned working at the final molding stage, it has been customary to roll the dough piece into a sheet and then coil the sheet into a cylindrical form to be placed in the pan. The sheeting operation is substantially the final working and to obtain the best results must be performed with care. In the past this has been done by passing the dough piece between a pair of rollers. Since it is desirable to roll the dough into a thin sheet, it is preferred to use several sets of rolls which operate on the dough successively and thus avoid danger of rupturing the dough by performing the sheeting operation in easy stages. However, to obtain optimum results the final thickness of the dough piece and the amount of reduction in each stage should be carefully chosen. This means that when the prior sheeters are used to sheet dough pieces of different sizes (as required by the market demand for loaves of different sizes and shapes) the machine must be adjusted or modified.

The problem of adjusting a sheeter for different size dough pieces is aggravated when automatic panning equipment is employed by the need to have the sheeted dough pieces centered on the same line as they are discharged from the sheeter onto an in-line molding conveyor. For this and other reasons, it is the practice to provide end flanges on the sheeting rolls and set the rolls so that the dough sheets will fill the space between the flanges. As a general rule this requires that in a series of pairs of sheeting rolls the length of the rolls progressively increases. For this reason and because the length of the last set of rolls must be sufficient to accommodate the largest size dough sheet, it is impossible to achieve optimum results on both small and large dough pieces, and it is therefore customary to compromise in the design of a sheeter so that only fair results may be achieved with dough pieces of the smallest and largest size by merely adjusting the roll spacing of the several pairs. Where better quality is desired, it has been necessary to change rolls, a time-consuming and expensive operation.

Accordingly, it is the object of this invention to provide a dough sheeter which is readily adjustable to achieve optimum results in the sheeting of a wide range of sizes of dough pieces. This and other objects of the invention will become apparent from the following specification, the drawings and the appended claims.

In the drawings:
FIGURE 1 is a plan view of the machine with parts of the auxiliary infeed conveyor broken away;
FIG. 2 is a longitudinal section taken on the line 2—2 of FIG. 1;
FIG. 3 is a fragmentary side view of the machine;
FIG. 4 is a transverse section taken on the line 4—4 of FIG. 3;
FIG. 5 is a fragmentary section taken on the line 5—5 of FIG. 1; and
FIG. 6 is a fragmentary section taken on the line 6—6 of FIG. 1.

In accordance with the present invention, the problem of adjusting a dough sheeter for different sizes of dough pieces is solved by providing a series of pairs of sheeting rollers which are permanently mounted and which, in addition to the adjustment of roll spacing in each pair, previously provided, are so arranged that one or more of the pairs may be bypassed by the dough pieces in order to select the pairs of rollers which will achieve optimum results. Any desired number of pairs of rolls may be employed so long as there are a minimum of two; but the preferred arrangement shown in the drawings involves three pairs of rolls which are of progressively increasing length and the use of selectively operable means for bypassing the first or last of the series. As a result the dough piece may be passed through all three pairs in succession or just through the first two or just through the last two. In addition, the first and second pairs may be used alone to sheet in a single step, if desired, and the thickness to which each pair will sheet dough may be adjusted in the conventional manner.

As will become apparent, the mechanism associated with each pair of rolls is to a large extent the same, thereby reducing the cost of manufacture and repair and facilitating assembly of sheeters having any desired number of pairs of rolls.

As shown best in FIGS. 1, 2, 3 and 4, the machine consists of a bottom plate 1, which is supported on a suitable base indicated fragmentarily at 2 and has three pairs of upstanding side frames 3, 4 and 5 which support sheeter units indicated generally by the numerals 6, 7 and 8, respectively. A belt conveyor 9 overlies the bottom plate and runs longitudinally of the machine in the direction of the arrow in FIG. 2. The belt, which may be of canvas or the like, discharges sheeted dough pieces from the machine. The belt 9 is supported on a smooth plate 10 to prevent sagging and is driven by a drum 12 carried by shaft 13. The belt may constitute a part of an in-line molding conveyor or may supply the sheeted dough pieces to such a conveyor. Dough pieces are delivered to the machine by a conveyor 14 which constitutes part of or connects to any suitable infeed mechanism which will supply lumps of proofed dough one at a time to the machine.

As best shown in FIG. 2, sheeter unit 6 comprises a roll 15 carried on a fixed axis by a shaft 16 journaled on the side frames 3 and a movable roll 17 carried by shaft 18 which is journaled on a pivoted carriage 20. The carriage 20 has a pair of side ears 21 which are fixed on pivot studs 22 journaled on the side frames 3. As a result of this construction, roll 17 may swing away from roll 15 to permit passage of a dough piece between them. However, the distance to which roll 17 may thus separate from roll 15 is limited by a hand screw 23 which is threaded into a crossbar 24 and engages a lug 25 on the carriage 20 as best shown in FIG. 2.

In accordance with standard practice, the rolls 15 and 17 are preferably covered with a suitable artificial resin which will not adhere to the dough pieces. As best shown in FIG. 1, the rolls 15 and 17 are relatively short measured along their axes and roll 15 is provided with end flanges 26 which overlie the ends of roll 17 in order to provide a completely enclosed gap between the rollers when they separate to pass a lump of dough. The inner surface of the flanges 26 is also covered with a sheet of nonadhering resin 27.

A dough scraper or deflector 28 is carried by a cross rod 29 fixed to the carriage with the point of the scraper or deflector operatively related to the surface of the roll 17. A second scraper or deflector 30 is fixed to a cross rod 31, which extends between the side frames 3, and has its point operatively related to the surface of the roll 15.

A guide plate or deflector 32 extends between the side frames 3 and has a central portion projecting downwardly between the flanges 26 on the roll 15 to guide dough pieces in their downward passage from the discharge end of conveyor 14 to the opening between the rolls 15 and 17. As a further means to prevent large dough pieces lapping over the edges of the flanges 26, a pair of forwardly extending side plates 33 are fixed to the guide plate 32 and overlie the flanges 26, as best shown in FIG. 2.

A second set of rollers 34 and 35 is mounted between the side frames 4. Roll 34 is carried by a shaft 36 and roll 35 is carried by a shaft 37. Rolls 34 and 35 are longer measured axially of the rolls than are the corresponding rolls 15 and 17 of the first set, but they are otherwise similarly constructed and mounted and they are similarly provided with dough scrapers or deflectors 38 mounted on a cross rod 39 and 40 mounted on a cross rod 41 which is supported on the carriage 42 of the roll 35. The carriage is fixed on pivoted studs 43 and has a lug 44 which is engaged by the end of a hand screw 45 as best shown in FIGS. 2 and 4. The hand screw is threaded through a cross bar 46 which extends between the side frames 4.

Means are provided for selectively supplying the second set of rolls 34 and 35 with unsheeted dough pieces directly from the infeed mechanism, or alternatively with partially sheeted dough pieces discharged by the first set of rolls 15 and 17. This is done by a pair of selectively operable conveyors. As best shown in FIGURE 2, one of these two conveyors indicated by the numeral 47 is a belt conveyor running over a pair of rolls carried by shafts 48 and 49 which are journaled between a pair of side plates 50. The side plates 50 are connected by a plurality of cross bars 51, only one of which appears in FIG. 2, but which serve to form a rigid frame structure including a side frame member 50 at each side of the belt conveyor 47. This conveyor frame supporting structure is pivoted on the shaft 48 which is journaled in the side frames 4 so that the conveyor 47 may be swung from its inoperative position shown in solid lines in FIG. 2 to an operative horizontal position shown in dotted lines in that figure, in which latter position it receives dough pieces discharged by the end of the conveyor 14 and delivers them directly to the second set of rollers 34 and 35.

In order to guide the unsheeted dough pieces into the second set of rollers when conveyor 47 is in its operative horizontal position, there is provided a removable guide plate 52, shown in dotted lines in FIG. 2, which extends beween the side frames 4. The upper portion of the ends of the plate 52 projects outwardly beyond the remainder of the plate for a short distance to form horizontally projecting ears which are adapted to seat in slots 53 formed in blocks 54 secured to the side frames 4, as best shown in the fragmentary FIG. 5. FIG. 5 shows a view of one of the side frames 4 with the deflecting or guide plate 52 removed from slots 53 and its supporting block 54. Forwardly projecting side plates 55, also shown in dotted lines in FIG. 2, are secured to the forward face of the guide plate 52 and overlie the flanges of the roller 34 in a manner similar to that described in connection with side plates 33 of the first set of rollers.

When it is desired to supply the second set of rolls with partially sheeted dough pieces from the first set of rolls, the conveyor 47 is raised to its vertical position shown in solid lines in FIG. 2 and the guide plate 52 with its associated side plates 55 is removed by simply lifting the plates out of the supporting slots 53 whereupon dough pieces discharged by the conveyor 14 pass through the first set of rolls and are then received by a conveyor 56 which is preferably formed of canvas or the like and extends over roller 57 on shaft 58 and roll 59 fixed on shaft 60. Shaft 58 is journaled on side frames 4 while shaft 60 is journaled between a pair of arms 61 which are fixed to a shaft 62 pivoted on the side frames 3 so that the roller 59 may be moved between an operative position corresponding to that shown in FIG. 2 and an inoperative position hereinafter more fully described.

The shaft 60 which carries the conveyor roller 59 projects through a slot 63 in one of the side frames 3, as best shown in FIG. 3, and is provided with a gear 64 which meshes with a mating gear on an idler shaft 65 journaled on one of the side frames 3. The shaft 65 and the rolls in conveyor 56 are driven from any suitable source of power by a chain 66 which travels in the direction indicated by the arrow in FIG. 3 and passes over a sprocket 67 carried by the shaft 16 of roll 15, a sprocket 68 carried by shaft 18 of roll 17, an idler sprocket 69, a sprocket 70 on the idler shaft 65, and finally a sprocket on the shaft 13 which operates conveyor 9. Thus, chain 66 drives both rolls 15 and 17, the conveyor 9 through shaft 13 and also drives the conveyor 56 through the gear 64 on shaft 60 and the mating gear (not shown) on idler shaft 65 when roller 59 is in its operative position illustrated in FIGS. 2 and 3.

Means are provided for shifting roll 59 between its operative and inoperative position, this means comprising a handle 71 fixed on shaft 62 and carrying a plunger housing 72 in which is mounted a plunger 73 which is normally urged by spring 74 in such a direction that its terminal end 75 enters one of two openings 76 or 77 in the side frame 3. As best shown in FIGS. 3 and 6, when the end of the plunger 73 is engaged in the opening 77 in side frame 3, it effectually holds the conveyor 59 in its operative position illustrated in FIG. 2. If the plunger is retracted by grasping the plunger knob 78 and the handle 71 moved in a counterclockwise direction until the plunger nose is inserted in the opening 76, the roller 59 will be locked in its inoperative position sufficiently to the left of its position in FIG. 2 to permit the dough pieces discharged by the first set of rollers to pass downwardly directly onto the conveyor 9. To guide dough pieces under these circumstances, there is provided an auxiliary guide plate 79 which is pivoted to the cross bar 31 and is normally urged by spring 80 into a position engaging a stop pin (not shown) which holds the guide plate 79 in a position inclined downwardly and somewhat forwardly from the lower end of the deflector 30. The upper end of one of the arms 61 is provided with a projecting nose 81 which engages the plate 79 and shifts it to its operative position shown in FIG. 2 when the conveyor roller 59 is fixed in its right-hand or operative position.

As a result of this construction dough pieces may either pass from the first set of rollers to the second set of rollers or directly from the first set to the discharge conveyor 9.

The second set of rollers is provided with a similar conveyor 82 which corresponds in all respects to the conveyor 56 and similarly serves to deliver sheeted dough pieces discharged by the second set of rolls 34 and 35 to a third set of rolls 83 and 84 carried by the side frames 5 or, alternatively, permits the sheeted dough pieces from the second set of rollers to be deposited directly on the discharge conveyor 9. The conveyor 82 is illustrated in FIG. 2 in its inoperative position in which the supporting arms 85 for the conveyor roller 86 are locked in their left-hand position, thereby permitting the deflector plate 87 to swing under the influence of spring 88 to a position engaging the stop pin 89 carried by side frames 4 in which position plate 87 guides the sheeted dough pieces from the second set of rolls directly to the conveyor 9.

Arms 85 are pivoted on a shaft 90 which carries a handle similar to the handle 71 on shaft 62 and associated plunger latching mechanism similar to that associated with handle 71 so that the roller 86 can be fixed in either operative or inoperative position. The remaining mechanism associated with conveyor 82 is similar in all respects to that associated with conveyor 56 and need not be further described.

The drive for the mechanism associated with the side frames 4 includes a chain 91 which is driven from any suitable power source and extends over a sprocket 92 on shaft 36 of roller 34, under sprocket 93 on shaft 37 for roller 35, over an idler sprocket 94 and a second idler sprocket 95 which is fixed on a shaft 96. The shaft 96 also carries a gear (not shown) which is adapted to mesh with the gear 97 on shaft 98 when the roller 86 is fixed to its operative or right-hand position. Shaft 98 is the shaft which supports the roller 86 and is carried by arms 85. An auxiliary drive chain 99, shown in FIG. 1, connects sprockets on shafts 36 and 48 in order to drive the auxiliary conveyor 47.

The third set of rolls mounted between the side frames 5 is similar in all respects to the first and second sets previously described except that they are of greater axial length than the second set, as best shown in FIG. 1, and the deflector plate 100 which corresponds to the plates 79 and 87 is mounted in a fixed position, there being no auxiliary conveyor corresponding to the conveyors 56 and 82 in the embodiment of the invention illustrated in the drawings. It will be understood, however, that if desired a fourth set of rolls could be included, in which event the third set would be equipped with a conveyor similar to the conveyors 56 and 82 and similarly capable of selectively delivering sheeted dough pieces to the fourth set of rolls or permitting them to pass directly to the conveyor 9.

It has been observed that when dough pieces are sheeted between a pair of rolls like those employed in the present apparatus, the first portion of the dough piece to pass through the rolls is not worked to as great a degree as the remainder because the rolls are not completely filled at the start. As a result, the dusted surface skin of the front end of the dough piece is not ruptured. This causes what is known as a "dry end" which in the case of in-line molders results in an undesirable center structure for the bread loaf. This defect is overcome in the sheeting apparatus of the present invention by providing means for doubling over only the front end of a sheeted dough piece as it enters the second and third set of rollers so that the front end of the dough piece is of greater thickness than the remainder. This mechanism, as best shown in connection with the third set of rolls in FIG. 2, comprises a sheet of flexible wire mesh 101 which is fixed to a round rod 102 having square ends which rest in square slots in the upper edges of rearwardly projecting ears 103 mounted on the side frames 5. A similar arrangement is provided in connection with the second set of rolls and the square end 104 of the corresponding rod for the second set of rolls and its position in a square slot in the upper surface of an ear 105, as shown more clearly in the fragmentary view of FIG. 5. As a result of this arrangement, the length of the sheet of wire mesh 101 may be adjusted by simply winding more or less of the wire mesh sheet on the round rod while the square ends are removed from the slots in the ears 103 or 105. The wire mesh sheets are so arranged that they will engage the forward end of a sheeted dough piece as it moves upwardly along conveyors 56 or 82 and catch the forward end and fold it backwardly in the manner indicated in the dotted line showing of a sheeted dough piece on the conveyor 56 in FIG. 2. The wire mesh sheets used for this purpose are similar to those commonly used for coiling dough pieces on a molding conveyor; however, their length is so shortened by adjustment or otherwise that only the front end of the sheeted dough piece is folded double thus providing a double thickness for initial passage through the gap between the rollers. This arrangement has the further advantage that it tends to square up the forward end of the dough piece and thus reduce the tendency of the bread loaf to be smaller at the ends than in the center.

It will be observed that there is provided in accordance with the present invention a three-stage sheeter having means for optionally by-passing either of the first two stages and for selectively passing the dough pieces either through all three stages of rollers in sequence, through only the last two stages in sequence, or through only the first two stages in sequence. In addition, if desired, dough may be sheeted in a single stage by use of either the first or second set of rollers. All of these adjustments may be made almost instantly by simply adjusting the handle 71, the handle on shaft 90 and the conveyor 47 and either removing or replacing the guide plate 52. When the machine is adjusted in the manner shown in solid lines in FIG. 2, a dough piece (indicated in dotted lines at 106) being delivered by conveyor 14 is dropped into the space between the first set of rolls 15 and 17 and sheeted into the particular form indicated in dotted lines at 107. The sheeted dough piece then passes upwardly on the conveyor 56, its front end is folded double by means of the sheet of flexible chain 108 on shaft 104 and then passes downwardly into the gap between the second set of rolls 34 and 35. It will be understood that under these circumstances the plate 52 and its associated side plates 55 will be removed from the machine. The dough piece then resheeted and further reduced in thickness by the second set of rolls and passed downwardly along the guide plate 87 to the discharge conveyor 9, thus completing the sheeting operation. If it is desired to subject the sheet to further working, the handle on shaft 90 is shifted to the right, as viewed in FIG. 3, thereby rendering conveyor 82 operative and delivering the sheeted dough piece from the second set of rolls to the third set 83 and 84.

While only one form is shown and described, it will be apparent that changes and rearrangements of the mechanism may be made without departing from the spirit and scope of the invention of the appended claims.

What is claimed is:

1. A dough sheeting apparatus adapted to receive lumps of proofed dough one at a time from an infeed mechanism and discharge sheeted dough pieces to a molder, said apparatus including a series of at least two pairs of horizontal sheeting rolls adapted to perform a sheeting operating on a dough piece in successive stages, means for directing dough pieces from an infeed mechanism to the series of rolls, means for discharging sheeted dough pieces from the apparatus, said apparatus being effective to pass a dough piece from said first means successively through the pairs of rolls in the series, and selectively operable means to cause the dough piece to bypass either one of the first two pairs of rolls.

2. A dough sheeting apparatus adapted to receive lumps of proofed dough one at a time from an infeed mechanism and discharge sheeted dough pieces to a molder, said apparatus including a series of pairs of horizontal sheeting rolls adapted to perform successive stages of a sheeting operation on a single dough piece, means normally operative to convey the sheeted dough piece to the inlet side of one pair of rolls when it is discharged by a preceding pair of rolls, and selectively operable means for delivering lumps of unsheeted dough to the inlet end of either the first or second pair of rolls in the series.

3. A dough sheeting apparatus adapted to receive lumps of proofed dough one at a time from an infeed mechanism and discharge sheeted dough pieces to a molder, said apparatus including a series of pairs of horizontal sheeting rolls adapted to perform successive stages of a sheeting operation on a single dough piece, means normally operative to convey the sheeted dough piece to the inlet side of one pair of rolls when it is discharged by a preceding pair of rolls, selectively operable means for rendering said last means ineffective and for discharging the dough piece from the apparatus without further sheeting, and selectively operable means for delivering lumps of unsheeted dough to the inlet end of either the first or second pair of rolls in the series.

4. A dough sheeting apparatus adapted to receive lumps of proofed dough one at a time from an infeed mechanism and deliver sheeted dough pieces to a molder, said apparatus including two pairs of horizontal sheeting rolls positioned on a common transverse central vertical plane, one roll of each pair having end flanges which embrace the ends of the mating roll to limit the width of the dough piece discharged by the pair of rolls, one of said pairs of rolls being of greater axial length than the other, and means selectively operable for delivering lumps of unsheeted dough from the infeed mechanism to the inlet side of either pair of rolls.

5. A dough sheeting apparatus adapted to receive lumps of proofed dough one at a time from an infeed mechanism and deliver sheeted dough pieces to a molder, said apparatus including two pairs of horizontal sheeting rolls positioned on a common transverse central vertical plane, one roll of each pair having end flanges which embrace the ends of the mating roll to limit the width of the dough piece discharged by the pair of rolls, one of said pairs of rolls being of greater axial length than the other, one of said pairs of rolls being adapted to receive lumps of dough from the infeed mechanism, and selectively operable means for delivering sheeted dough pieces discharged by one of said pairs of rolls to the inlet side of the other pair of rolls or for causing said dough pieces to be discharged from the apparatus without passing through said other pair of rolls.

6. A dough sheeting apparatus adapted to receive lumps of proofed dough one at a time from an infeed mechanism and deliver sheeted dough pieces to a molder, said apparatus including two pairs of horizontal sheeting rolls positioned on a common transverse central vertical plane, one roll of each pair having end flanges which embrace the ends of the mating roll to limit the width of the dough piece discharged by the pair of rolls, one of said pairs of rolls being of greater axial length than the other, means selectively operable for delivering lumps of unsheeted dough from the infeed mechanism to the inlet side of either pair of rolls, and selectively operable means for delivering sheeted dough pieces discharged by the first of said pairs of rolls to the inlet side of the other pair of rolls for causing said dough pieces to be successively sheeted by both pairs of rolls.

7. A dough sheeting apparatus adapted to receive lumps of proofed dough one at a time from an infeed mechanism and deliver sheeted dough pieces to a molder, said apparatus including two pairs of horizontal sheeting rolls positioned on a common transverse central vertical plane, one roll of each pair having end flanges which embrace the ends of the mating roll to limit the width of the dough piece discharged by the pair of rolls, one of said pairs of rolls being of greater axial length than the other, one of said pairs of rolls being adapted to receive lumps of dough from the infeed mechanism, a horizontal conveying means extending below both pairs of rolls in a direction transverse to said rolls and adapted to receive sheeted dough pieces discharged by each pair and convey them away from the rolls, and means selectively operable for diverting sheeted dough pieces discharged by said one pair of rolls from the normal path of said conveying means and delivering them to the inlet side of the other pair of rolls.

8. A dough sheeting apparatus adapted to receive lumps of proofed dough one at a time from an infeed mechanism and deliver sheeted dough pieces to a molder, said apparatus including two pairs of horizontal sheeting rolls positioned on a common transverse central vertical plane, one roll of each pair having end flanges which embrace the ends of the mating roll to limit the width of the dough piece discharged by the pair of rolls, one of said pairs of rolls being of greater axial length than the other, means selectively operable for delivering lumps of unsheeted dough from the infeed mechanism to the inlet side of either pair of rolls, a horizontal conveying means extending below both pairs of rolls in a direction transverse to said rolls and adapted to receive sheeted dough pieces discharged by each pair and convey them away from the rolls, and means selectively operable for diverting sheeted dough pieces discharged by said one pair of rolls from the normal path of said conveying means and delivering them to the inlet side of the other pair of rolls.

9. A dough sheeting apparatus adapted to receive lumps of proofed dough one at a time from an infeed mechanism and discharge sheeted dough pieces to a molder, said apparatus including a series of at least three pairs of horizontal sheeting rolls adapted to perform a sheeting operation on a dough piece in successive stages, conveying means extending below the series of sheeting rolls in position to receive sheeted dough pieces from each pair of rolls and discharge it from the apparatus, means normally effective to deliver sheeted dough pieces discharged by the first pair of rolls in the series to the inlet side of the second pair of rolls, means selectively operable to render said last mentioned means ineffective and thereby permit the dough pieces discharged by the first of rolls to be received by said conveying means, means normally effective to deliver sheet dough pieces discharged by the second pair of rolls in the series to the inlet side of the third pair of rolls, and means selective operable to render said last mentioned means ineffective and thereby permit the dough pieces discharged by the second pair of rolls to be received by said conveying means.

10. A dough sheeting apparatus adapted to receive lumps of proofed dough one at a time from an infeed mechanism and discharge sheeted dough pieces to a molder, said apparatus including a series of at least three pairs of horizontal sheeting rolls adapted to perform a sheeting operation on a dough piece in successive stages, conveying means extending below the series of sheeting rolls in position to receive sheeted dough pieces from each pair of rolls and discharge it from the apparatus, means normally effective to deliver sheeted dough pieces discharged by the first pair of rolls in the series of the inlet side of the second pair of rolls, means selectively operable to render said last mentioned means ineffective and thereby permit the dough pieces discharged by the first pair of rolls to be received by said conveying means, means normally effective to deliver sheeted dough pieces discharged by the second pair of rolls in the series to the inlet side of the third pair of rolls, means selectively operable to render said last mentioned means inffective and thereby permit the dough pieces discharged by the second pair of rolls to be received by said conveying means, and means for selectively delivering unsheeted lumps of dough to the inlet side of either of the first two pairs of rolls.

References Cited in the file of this patent
UNITED STATES PATENTS

| | | |
|---|---|---|
| 122,602 | Gunther | Jan. 9, 1872 |
| 240,715 | Holmes | Apr. 26, 1881 |
| 402,396 | Bryce et al. | Apr. 30, 1889 |
| 518,454 | Holmes | Apr. 17, 1894 |
| 2,357,085 | Cohen et al. | Aug. 29, 1944 |
| 2,869,483 | Naylor | Jan. 20, 1959 |

UNITED STATES PATENT OFFICE
CERTIFICATE OF CORRECTION

Patent No. 3,055,318

September 25, 1962

Eugene O. Engels

It is hereby certified that error appears in the above numbered patent requiring correction and that the said Letters Patent should read as corrected below.

Column 8, line 37, before "of" insert -- pair --; line 38, for "sheet" read -- sheeted --; line 40, for "selective" read -- selectively --.

Signed and sealed this 26th day of March 1963.

(SEAL)
Attest:

ESTON G. JOHNSON
Attesting Officer

DAVID L. LADD
Commissioner of Patents